United States Patent
Dagum et al.

(10) Patent No.: US 11,831,536 B2
(45) Date of Patent: Nov. 28, 2023

(54) METHOD AND SYSTEM FOR USING A DOWNLOADABLE AGENT FOR A COMMUNICATION SYSTEM, DEVICE, OR LINK

(71) Applicant: ASSIA SPE, LLC, Wilmington, DE (US)

(72) Inventors: Leonardo Dagum, Redwood City, CA (US); Philip Bednarz, Palo Alto, CA (US); Marc Goldburg, Redwood City, CA (US); Ardavan Maleki Tehrani, Atherton, CA (US); Wonjong Rhee, San Francisco, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 106 days.

(21) Appl. No.: 17/360,914

(22) Filed: Jun. 28, 2021

(65) Prior Publication Data

US 2021/0328903 A1    Oct. 21, 2021

Related U.S. Application Data

(63) Continuation of application No. 14/414,436, filed as application No. PCT/US2012/057152 on Sep. 25, 2012, now Pat. No. 11,050,654.

(Continued)

(51) Int. Cl.
*H04L 43/50* (2022.01)
*H04L 43/0829* (2022.01)
(Continued)

(52) U.S. Cl.
CPC ............ *H04L 43/50* (2013.01); *H04L 12/407* (2013.01); *H04L 41/048* (2013.01); *H04L 41/26* (2013.01);
(Continued)

(58) Field of Classification Search
CPC ..... H04L 43/50; H04L 12/407; H04L 41/048; H04L 41/26; H04L 41/32; H04L 43/04;
(Continued)

(56) References Cited

U.S. PATENT DOCUMENTS

| 7,675,862 B2* | 3/2010 | Pham ...................... H04L 41/22 |
| | | 370/245 |
| 11,050,654 B2* | 6/2021 | Dagum ................... H04L 41/32 |

(Continued)

FOREIGN PATENT DOCUMENTS

| CN | 102640525 A | 8/2012 |
| WO | 2012091725 A1 | 7/2012 |

OTHER PUBLICATIONS

European office action dated Sep. 2, 2022 in related European patent application No. 12773454.9, (7pgs).

(Continued)

*Primary Examiner* — Michael J Moore, Jr.
(74) *Attorney, Agent, or Firm* — North Weber & Baugh LLP; Michael North

(57) ABSTRACT

Described is a method performed by a downloadable agent, the method comprising: collecting WAN performance information, wherein the downloadable agent is executable on a computing device coupled to a LAN of a broadband subscriber, wherein the LAN is coupled by another device to a WAN; and transmitting the WAN performance information to a machine; wherein the machine is operable to: store and analyze the performance information to generate an analysis result; and report the analysis result to at least one of the broadband subscriber and its service provider. Described is a corresponding system which comprises a database; and a server coupled to the database, the server operable to: receive WAN performance information from a downloadable agent; store the information in the database, analyze the information to generate an analysis result; and report the (Continued)

analysis result to at least one of the broadband subscriber and the broadband subscriber's service provider.

14 Claims, 11 Drawing Sheets

Related U.S. Application Data

(60) Provisional application No. 61/671,672, filed on Jul. 13, 2012.

(51) Int. Cl.
| | | |
|---|---|---|
| *H04L 43/0852* | (2022.01) | |
| *H04L 43/0888* | (2022.01) | |
| *H04L 41/00* | (2022.01) | |
| *H04L 43/04* | (2022.01) | |
| *H04L 41/046* | (2022.01) | |
| *H04L 12/407* | (2006.01) | |
| *H04L 43/00* | (2022.01) | |
| *H04L 41/0681* | (2022.01) | |
| *H04L 41/0853* | (2022.01) | |
| *H04L 41/22* | (2022.01) | |
| *H04L 41/12* | (2022.01) | |
| *H04L 43/16* | (2022.01) | |
| *H04L 43/0817* | (2022.01) | |
| *H04L 67/00* | (2022.01) | |
| *H04L 41/083* | (2022.01) | |
| *H04L 43/10* | (2022.01) | |
| *H04L 43/087* | (2022.01) | |
| *H04L 43/0882* | (2022.01) | |
| *H04L 41/0826* | (2022.01) | |
| *H04L 43/55* | (2022.01) | |

(52) U.S. Cl.
CPC .............. *H04L 41/32* (2013.01); *H04L 43/04* (2013.01); *H04L 43/0829* (2013.01); *H04L 43/0852* (2013.01); *H04L 43/0888* (2013.01); *H04L 43/14* (2013.01); *H04L 41/0681* (2013.01); *H04L 41/083* (2013.01); *H04L 41/0826* (2013.01); *H04L 41/0853* (2013.01); *H04L 41/12* (2013.01); *H04L 41/22* (2013.01); *H04L 43/087* (2013.01); *H04L 43/0817* (2013.01); *H04L 43/0882* (2013.01); *H04L 43/10* (2013.01); *H04L 43/16* (2013.01); *H04L 43/55* (2022.05); *H04L 67/34* (2013.01)

(58) Field of Classification Search
CPC ............. H04L 43/0829; H04L 43/0852; H04L 43/0888; H04L 43/14; H04L 41/0681; H04L 41/0826; H04L 41/083; H04L 41/0853; H04L 41/12; H04L 41/22; H04L 41/5038; H04L 43/0817; H04L 43/087; H04L 43/0882; H04L 43/10; H04L 43/16; H04L 67/34; Y04S 40/00

See application file for complete search history.

(56) References Cited

U.S. PATENT DOCUMENTS

| | | | |
|---|---|---|---|
| 2002/0138443 A1* | 9/2002 | Schran | G06Q 20/382 |
| | | | 705/64 |
| 2004/0044761 A1* | 3/2004 | Phillipi | H04L 67/63 |
| | | | 709/223 |
| 2005/0114500 A1* | 5/2005 | Monk | H04L 41/22 |
| | | | 709/224 |
| 2006/0023638 A1* | 2/2006 | Monaco | H04L 43/0888 |
| | | | 370/252 |
| 2008/0089347 A1* | 4/2008 | Phillipi | H04L 41/083 |
| | | | 370/400 |
| 2011/0238733 A1 | 9/2011 | Yoo et al. | |
| 2012/0244863 A1* | 9/2012 | Burnette | H04W 28/24 |
| | | | 455/436 |
| 2012/0257535 A1* | 10/2012 | DeWath | H04L 43/0876 |
| | | | 370/253 |
| 2014/0047100 A1* | 2/2014 | Lachapelle | H04L 43/08 |
| | | | 709/224 |
| 2014/0130111 A1* | 5/2014 | Nulty | H04N 21/6118 |
| | | | 725/107 |
| 2015/0207720 A1* | 7/2015 | Dagum | H04L 41/32 |
| | | | 370/252 |
| 2021/0328903 A1* | 10/2021 | Dagum | H04L 41/048 |
| 2022/0174421 A1 | 6/2022 | Song et al. | |

OTHER PUBLICATIONS

Chinese office action dated Sep. 16, 2022 in related Chinese patent application No. 201911016737.1, (9 pgs).
Response to Chinese office action filed Nov. 15, 2022 in related Chinese patent application No. 201911016737.1, (2 pgs).
European Notice of Intend to Grant dated Dec. 3, 2021 in related European Application No. 12773454.9, (7 pgs).
Office action dated Apr. 6, 2022 in related Chinese patent application No. 201911016737.1, (24 pgs).
Response to office action filed Aug. 17, 2022 in related Chinese patent application No. 201911016737.1, (3 pgs).
European notice of intent to grant dated Jan. 30, 2023 in related European patent application No. 12773454.9, (52pgs).
Chinese notice of granting a patent right dated Feb. 12, 2023 in related Chinese patent application No. 201911016737.1, (5 pgs).

\* cited by examiner

METHOD AND SYSTEM FOR USING A DOWNLOADABLE AGENT FOR A COMMUNICATION SYSTEM, DEVICE, OR LINK

CROSS-REFERENCE TO RELATED APPLICATIONS

The present application is a continuation of and claims priority benefit, to commonly-assigned U.S. patent application Ser. No. 14/414,436, entitled "METHOD AND SYSTEM FOR USING A DOWNLOADABLE AGENT FOR A COMMUNICATION SYSTEM, DEVICE, OR LINK", naming Leonardo Dagum, Philip Bednarz, Marc Goldburg, Ardavan Maleki Tehrani, Wonjong Rhee as inventors, filed on Jan. 12, 2015, which is a 371 National Stage of International Patent Application No. PCT/US2012/057152, entitled "METHOD AND SYSTEM FOR USING A DOWNLOADABLE AGENT FOR A COMMUNICATION SYSTEM, DEVICE, OR LINK", naming Leonardo Dagum, Philip Bednarz, Marc Goldburg, Ardavan Maleki Tehrani, Wonjong Rhee as inventors and, filed on Sep. 25, 2012, which claims benefit of provisional Application No. 61/671,672, entitled "METHOD AND SYSTEM FOR USING A DOWNLOADABLE AGENT FOR A COMMUNICATION SYSTEM, DEVICE, OR LINK", naming Leonardo Dagum, Philip Bednarz, Marc Goldburg, Ardavan Maleki Tehrani, Wonjong Rhee as inventors and, filed on Jul. 13, 2012, which application is hereby incorporated herein by reference in its entirety.

BACKGROUND

In current practice, Wide Area Network (WAN) and/or Local Area Network (LAN) performance information is not centrally analyzed by a communication device coupled to such networks to account for information such as topological information, geographical information, user's network usage pattern, quality of network connection, time, throughput, etc. Accordingly, communication devices coupled to such networks may operate with lower performance than otherwise possible because the communication devices have no means for knowing performance data that can be used to intelligently assess and manage performance of the communication device and/or network connection. An example of a communication device is a smart phone, computer, a router, etc.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
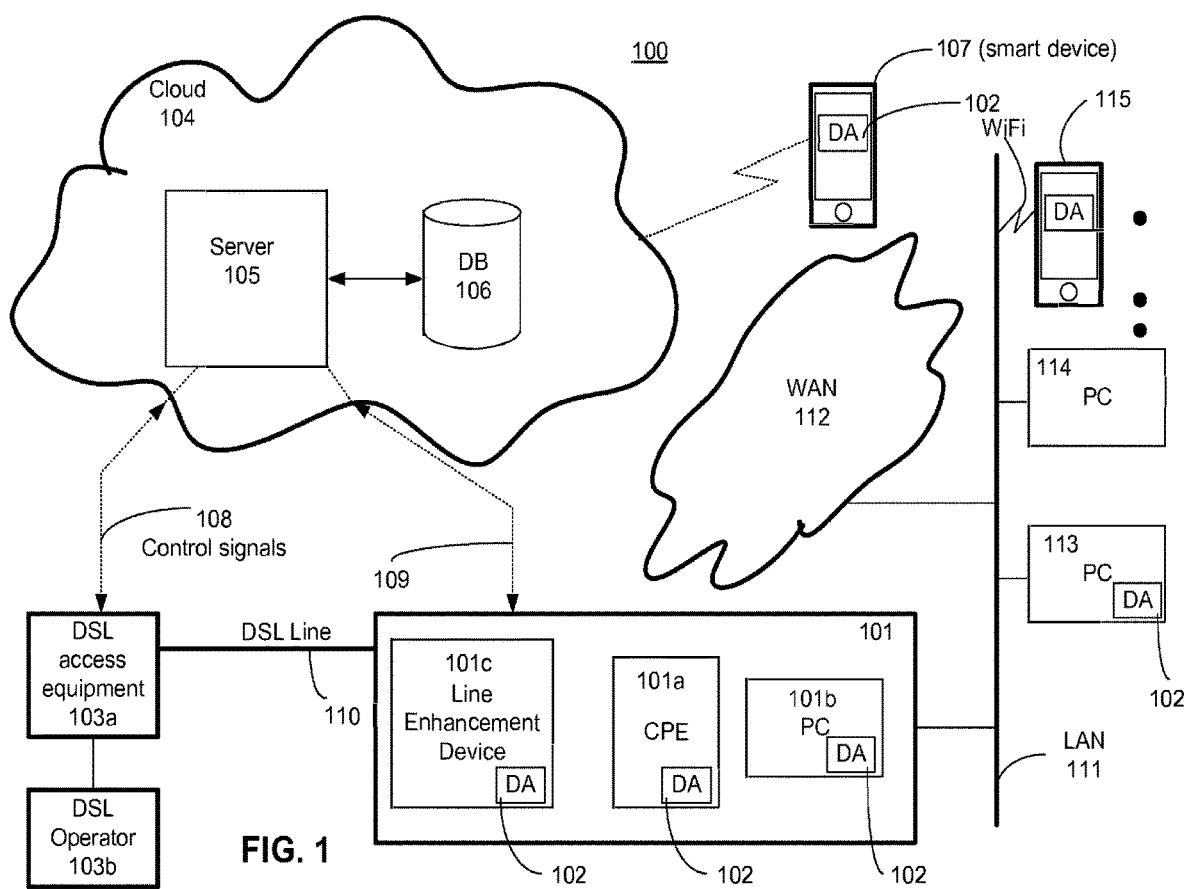
FIG. 1 is a communication network with some or all communication devices having a downloadable agent to assist with performance analysis, according to one embodiment of the disclosure.

One of the problems with current communication systems is that information about the communication device and communication device performance inside the local area network (LAN) is generally available to other devices on the LAN, however not available to machines outside the LAN; i.e., the wide area network (WAN), or the cloud. In order to overcome this and other problems, the embodiments of this disclosure describe an agent (also called downloadable agent herein) which is placed inside the LAN, where the agent collects data on behalf of the cloud or WAN-based server and then transfers that data to the cloud or WAN-based server for analysis. Such an embodiment allows collection of information on all devices centrally for a comprehensive analysis.

The embodiments herein describe a method performed by a downloadable agent for collecting information associated with a communication device and then sending the collected information to another machine for analysis. In one embodiment, other interfaces of the communication device may be used in conjunction or independent of the downloadable agent to collect information associated with the communication device and then to send that collected information to another machine for analysis.

In one embodiment, the other machine is a server in a cloud which has access to information related to many communication devices and can use that information to generate a performance report for the communication device. In one embodiment, the server in the cloud does not have access to information of the communication devices in the absence of the downloadable agents. The downloadable agent, that may be downloaded on a user's browser or installed on the communication device, provides the server access to the information associated with the communication device. In one embodiment, the downloadable agent receives the report. In one embodiment, the report can be used to enhance the performance of the communication device. In one embodiment, the method comprises: collecting wide area network (WAN) performance information, wherein the downloadable agent is executable on a computing device coupled to a (local area network) LAN of a broadband subscriber, wherein the LAN is coupled by another device to a WAN; and transmitting the WAN performance information to a machine. In one embodiment, the downloadable agent may be executable on a variety of different computer platforms and operating systems.

The term "Local Area Network" (LAN) herein generally refers to a computer or communication network that interconnects computers or communication network that interconnects computers or communication devices in a limited area such as a home, school, computer laboratory, or office building using network media.

The term "Wide Area Network" (WAN) herein generally refers to a telecommunication network that covers a broad area (i.e., any network that links across metropolitan, regional, or national boundaries) compared to the limited area covered be a LAN.

In one embodiment, the machine (e.g., a server in a cloud) is operable to: store the WAN performance information in a database associated with the machine, analyze the WAN performance information to generate an analysis result; and report the analysis result to at least one of the broadband subscriber and the broadband subscriber's service provider. In one embodiment, the broadband subscriber and/or the broadband subscriber's service provider analyses the report and adjusts various performance parameters associated with the communication device or the networking devices with which it communicates to enhance the performance of the communication.

The term "performance" herein refers generally to network throughput (e.g., TCP/UDP), latency, jitter, connectivity, error rates, power consumption, transmit power, etc Improving performance of the communication system includes increasing throughput, reducing error rate and latency, improving (i.e., reducing) jitter, reducing power consumption, etc. for the communicating system. The term "TCP" stands for Transmission Control Protocol. The term "UDP" refers to User Datagram Protocol. The term "successful" herein refers to an indication suggesting safe receipt of a packet that is often confirmed by ACK (acknowledge) message packet. In another embodiment, operational data such as error counts, retransmission counts, modulation, signal strength, etc. are used to estimate the performance and throughput of the communications link.

The embodiments herein allow a user of a communication device to install (download) an agent on their communication device, for example, personal computer, tablet computer, laptop, network gateway, smart phone, smart device, computer, DSL (Digital Subscriber Line) access equipment, router, etc) so that the communication device is able to collect performance related information for analysis by another machine (e.g., a server on a cloud) and then receive at least one of several statistical and commercial analyses including throughput and other measures of communications performance; availability of higher bandwidth for operating a communication device/link (e.g., DSL) service; purchase information (or service product information) for improving communication device/link (e.g., DSL) service performance; or utilization information for optimizing a consumers' communication device/link (e.g., DSL) service cost. Such downloadable agent allows for customized enhancement of user experience with a communication device by enhancing the communication device's or link's performance.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, electromagnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 is a communication network 100 with some or all communication devices having a respective downloadable agent (DA) to assist with performance analysis, according to one embodiment of the disclosure. In one embodiment, the communication network 100 comprises a local network 101 (e.g., a network at home) having Customer Premises Equipment (CPE) 101*a* and a personal computer (PC) 101*b*. In one embodiment, the local area network (LAN) 101 optionally comprises a line enhancement device 101*c* which is any device coupled to the DSL 110 that improves the quality or performance on the DSL 110. In one embodiment, the line enhancement device 101*c* is a standalone device. In another embodiment, the line enhancement device 101*c* is integrated with the CPE 101*a*. In one embodiment, one or more devices of the LAN (e.g., home LAN) 101 are operable to communicate with the server 105 via the Internet 109 (via wired or wireless connections).

In one embodiment, the communication network 100 comprises a server 105 coupled to a database 106, wherein the server and/or the database 106 reside in a cloud 104.

The term "cloud" herein refers generally to cloud computing which is the delivery of computing and storage capacity as a service to a community of end-recipients. The term "cloud" is indicated with use of a cloud-shaped symbol 104 as an abstraction for the complex infrastructure it contains in system diagrams. Cloud computing entrusts services with a user's data, software and computation over a network. In one embodiment, the server 105 resides in the cloud 104 and is operable to perform complex analysis (e.g., statistical) based on information collected from other communication devices via the Internet.

In one embodiment, the communication network 100 comprises a DSL access equipment 103a (also called a DSL access network, or DSL node) which is operable to communicate with the CPE 101a via a DSL line 110. In one embodiment, the DSL access equipment 103a comprises a DSLAM (digital subscriber line access multiplexer). In one embodiment, the DSL access equipment 103a comprises a CO (central office). In one embodiment, the DSL access equipment 103a receives control signals 108 from the server 105 that instruct a DSL operator 103b about ways to improve performance of its customers e.g., CPE 101a, etc.

In one embodiment, the control signals 108 include at least one or more of signals or commands related to: power, for example, transmit power, spectrum control, for example, Power Spectral Density (PSD) mask, margin, data rate, latency/delay, coding, for example, Forward Error Correction (FEC) coding.

In one embodiment, the server 105 is operable to access external communication devices (external to the cloud 104) through cloud-based applications via a web browser or mobile application. In the embodiments discussed herein the downloadable agent (DA) 102 is operable to communicate with the resources (e.g., server 105, database 106) of the cloud 104. In one embodiment, the DA 102 may be downloaded from any platform e.g., a disk, memory stick, web browser, web server, etc. In one embodiment, the DA 102 associated with a communication device executes on an Internet browser (e.g., Safari®, Netscape®, Firefox®, Internet Explorer®, etc). In one embodiment, the DA 102 associated with the communication device is accessible remotely via the Internet.

In one embodiment, the DA 102 is operable to execute on multiple computing platforms with different operating systems. For example, the DA 102 may operate on operating systems including Android, Berkley Software Distribution (BSD), iOS, GNU/Linux, Apple Mac OS X, Microsoft Windows, Windows Phone, and IBM z/OS. In one embodiment, the DA 102 is operable to execute in a virtual machine (VM). A VM is a software implementation of a machine (e.g., a computer) that executes programs like a physical machine. Examples of virtual machines include a Java Virtual Machine and the previously mentioned operating systems executing in VMWare, Virtual Box or the like. In one embodiment, the DA 102 may receive automatic updates to keep the application up to date with the latest features. In one embodiment, the downloadable agent is dynamically downloaded to the computing device.

The term "dynamically" herein refers to the downloading of an agent by the computing device on-demand and prior to use of the agent. A dynamically downloaded agent may be deleted from the computing device following the use of that agent.

In one embodiment, the communication network 100 comprises a wireless device, for example, a smart device (e.g., smart phone, tablet, etc) with a DA 102. In one embodiment, the DA 102 is operable to review an analysis report generated by the server 105 for any of the communicating devices it has authorization to access.

In one embodiment, the server 105 is operable to receive WAN performance information from a DA 102, wherein the DA 102 is executable on a computing device (e.g., 101a-b, 107,113) coupled to a LAN 111 of a broadband subscriber, wherein the LAN 111 is coupled by another device to a WAN 112. In one embodiment, the DSL modem and a home gateway couple the LAN 111 to the WAN 112. In one embodiment, the DSL modem and home gateway are integrated into a single enclosure.

In one embodiment, the DA 102 associated with the communication device collects data locally within the communication device and then periodically sends the collected data to the server 105. In one embodiment, the DA 102 may wait for certain conditions or thresholds to be met before sending all collected data to the server 105.

In one embodiment, the conditions and/or thresholds are related to a function of the type of data collected. For example, collected date may include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, the conditions are limits or thresholds on a performance level related to collected data. In one embodiment, a condition is an upper limit on jitter, or a lower limit on throughput. For example, if throughput drops below a lower limit/threshold, then the DA 102 may report and send the data to the server 105. In another example, if packet loss exceeds an upper limit, then the DA 102 may report and send the data to the server. In one embodiment, a condition is time expiration on a scheduled collection. For example, the DA 102 may send data to the server 105 after a pre-defined time is expired.

In another embodiment, server 105 collects information from the DA's, through server initiated communication. In one embodiment, server 105 collects information by polling or scheduled based system. One such example of polling is ping. In one embodiment, the server 105 may send a signal to a DA 102, or ping a DA 102, or communicate with a DA 102 on scheduled basis, after which the DA 102 sends collected information to the server 105.

In one embodiment, the computing device is one of: computer, personal computer, laptop/desktop, smart phone, tablet computing device; an access point (AP); a base station; a wireless smart phone device; a wireless LAN device; an access gateway; a router, a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the server 105 is operable to store the WAN performance information in the database 106 associated with the server 105. In one embodiment, the server 105 is operable to store the WAN performance information with an associated timestamp. In one embodiment, the DA 102 is operable to collect LAN performance data from at least one of the computing device (e.g., 101b) and another device (e.g., PC 113) coupled to the LAN 111. In one embodiment, the server 105 is operable to receive the LAN performance data from the DA 102.

In one embodiment, the WAN and LAN performance information include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

Topological information may include information regarding the WAN or LAN topology. For example, whether a DSL modem is behind a firewall, or whether the Internet gateway is connected to a Wi-Fi access point via a router. The geographical information may include the address or global positioning system (GPS) location of the WAN or LAN modem, or the Internet gateway. The geographical information may be useful for, for example, neighborhood analysis, and for correlating information regarding neighbors, or users in a given geographical location. Environment Statistics may include any statistics related to the environment surrounding the WAN or LAN. For example, usage statistics, statistics on periods of peak operation, statistics on the data traffic (peak traffic, average traffic, etc.).

In one embodiment, LAN performance information also includes, without limitation: LAN media type, such as Ethernet, Wi-Fi, or powerline adapters; LAN media throughput rates; channel assignments for Wi-Fi media; Wi-Fi mode such as 802.11g or 802.11n; Wi-Fi transmit power levels; and spectral masks for powerline communication.

In one embodiment, the server 105 is operable to analyze the WAN performance information to generate an analysis result. In one embodiment, the server 105 is operable to generate analysis result by computing throughput of DSL connection 110 by collecting current performance metrics associated with DSL service. In one embodiment, the server 105 is operable to perform statistical analysis, including throughput, based on information received from the DA 102 and other information in the database.

In one embodiment, the server 105 is operable to compute throughput of a communication link (e.g., Wi-Fi or Ethernet link 109) by probing. In one embodiment, the process of probing comprises: transmitting probing data from a communication device (e.g., PC 101*b*) to another communication device (e.g., PC 113); and waiting for a predetermined time before reading operational data including counter values related to user data traffic. In one embodiment, the counter values include at least one of packet error counts, packet retransmission counts, successful ACK message counts, etc. The throughput information discussed in this embodiment and other embodiments of this disclosure could include at least one or more of the following: instantaneous speed or data rate, average data rate, and/or information on the peak and minimum data rates of a connection or communication link associated with the LAN and/or with the associated WAN.

The term "active probing" or simply "probing" herein generally refers to testing of a communication network by sending test pattern/data over the network from one communication device to another communication device, and then measuring the response from the sent test pattern. The response data is also referred herein as "active data" or "active measurement data" which is data associated with active probing of a communication network.

The term "operational data" herein generally refers to user visible or accessible data and is generally used for debugging and basic performance monitoring of communications systems.

In one embodiment, the method of probing comprises: transmitting probing data from a communication device (e.g., PC 101*b*) to another communication device (e.g., PC 113); and receiving a report indicating amount of data or data received by the other communication device.

In one embodiment, the server 105 is operable to determine availability of higher bandwidth for operating a DSL service. In one embodiment, the server 105 is operable to determine purchase information (or service product information) for improving DSL service performance. In one embodiment, the server 105 is operable to determine network, service, or communication link utilization information for optimizing a consumer DSL service cost. In one embodiment, the server 105 is operable to group data in the database 106 according to at least one of geographical location, services type, service provider, or time. The service product information includes information regarding the type and specification of the DSL service or services which is a DSL service user/customer has purchased from the DSL service provider.

In one embodiment, the server 105 receives information from other devices and/or sources other than the communication devices to perform a comprehensive analysis of the performance of the communication system as a whole and/or individually for the communication devices in the communication system. Examples of the other devices and/or sources include near-by radio stations, location of AM radio stations, goals or business rules defined by an operator, weather forecast from the National Weather Service, etc.

In one embodiment, the server 105 is operable to report the analysis result by sending availability of higher bandwidth for operating a DSL service to the DA 102 of 101*a*. In one embodiment, the server 105 is operable to report the analysis result by sending purchase information (or service product information) to PC 101*b*, smart device 107, or the user for improving DSL service performance. In one embodiment, the server 105 is operable to report the analysis result by sending utilization information to PC 101*b*, smart device 107, or any device accessible by the user for optimizing consumer DSL service cost. In one embodiment, the DA 102 receives updated or new operational parameters from the server 105 based on the analysis performed by the server 105. For example, the server 105 when analyzing the date collected by the DA 102 of 101*a*, also takes into account historical information about the communication device 101*a* and information from other communication devices coupled to the network to provide updated operational parameters to the DA 102 of 101*a* so that the communication device 101*a* operates more efficiently under the current circumstances.

In one embodiment, the server 105 is operable to report the analysis result to at least one of the broadband subscriber and the broadband subscriber's service provider. In one embodiment, the server 105 is operable to report the analysis result by sending statistical analysis to the PC 101*b*, smart device 107, or any device accessible by the user, the statistical analysis including throughput. In one embodiment, the server 105 is operable to report the analysis result by sending availability of higher bandwidth for operating a DSL service to the DA 102 of 101*a*. In one embodiment, the server 105 is operable to report the analysis result by sending purchase information (or service product information) to PC 101*b*, smart device 107, or the user for improving DSL service performance. In one embodiment, the server 105 is operable to report the analysis result by sending utilization information to PC 101b, smart device 107, or any device accessible by the user for optimizing consumer DSL service cost.

In one embodiment, the server 105 is operable to receive an on-demand change request. In one embodiment, the on-demand change is associated with at least one of: throughput, latency, packet loss, or jitter. For example, DA 102 of the PC 101b sends a request via connection 109 to the server 105 to acquire higher throughput than current throughput for its DSL line 110. In such an embodiment, the server 105 performs analysis based on available data in the database 106 and determines if the on-demand request by the PC 102c can be met. If it can be met, a report is provided to the DA 102 by the server 105 with information (e.g., cost etc) about how to improve throughput.

In one embodiment, the server 105 provides a marketplace of ideas for the communication devices for trading bandwidth (or performance) for media (or related) services. For example, the server 105 may provide information to the communication devices (after performing its analysis from the collected and historical information of the communication system) such as subscription to premium media services, direct payment, etc in exchange for improved performance.

Figure 2:
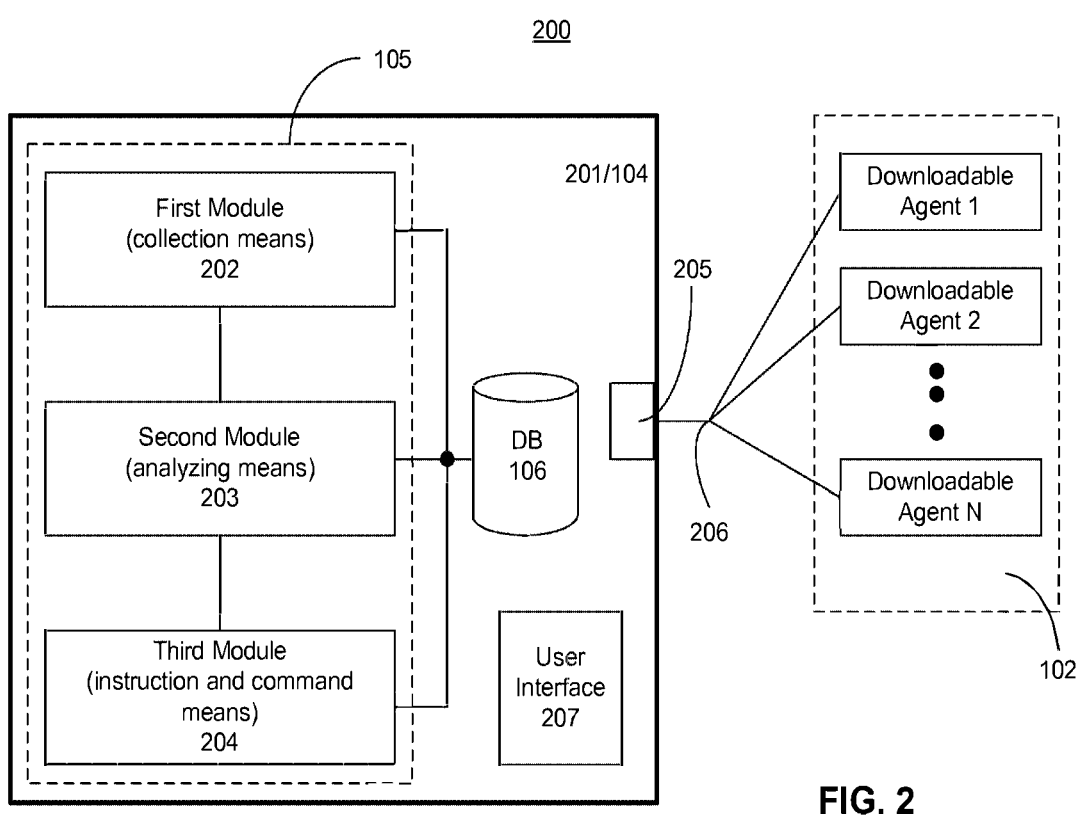
FIG. 2 is a system with a server (or the analysis machine) operable to communicate with one or more downloadable agents, according to one embodiment of the disclosure.

FIG. 2 is a system 200 with the server 105 (or the analysis machine) operable to communicate with one or more downloadable agents 102, according to one embodiment of the disclosure. Embodiments of FIG. 2 are described with reference to FIG. 1. In one embodiment, the system 200 comprises a device 201 (e.g., cloud 104) having the server 105 coupled to the database 106.

In one embodiment, the server 105 comprises: a first module 202 for collecting the WAN and LAN performance and configuration information. In one embodiment, the server 105 comprises a second module 203 for performing statistical analysis using the WAN and LAN performance and configuration information. In one embodiment, the server 105 comprises a third module 204 for generating instruction and commands according to the statistical analysis for at least one of the broadband subscriber, networking equipment at the broadband subscriber's premises, the service provider of the broadband subscriber and the access equipment of the service provider.

In one embodiment, the modules (e.g., DA 102) that receive the instruction and command from the third module 204 are accessible by the Internet. In one embodiment, the server 105 comprises: a management interface 205 for communicating with the DA 102 (any one of DAs 1-N, where 'N' is a positive integer) via the Internet 206 (e.g., 111, 109 of FIG. 1). In one embodiment, the server 105 comprises: a user interface module 207 for providing access to other communication devices and for displaying information associated with the first 202, second 203 and third 204 modules.

Figure 3:
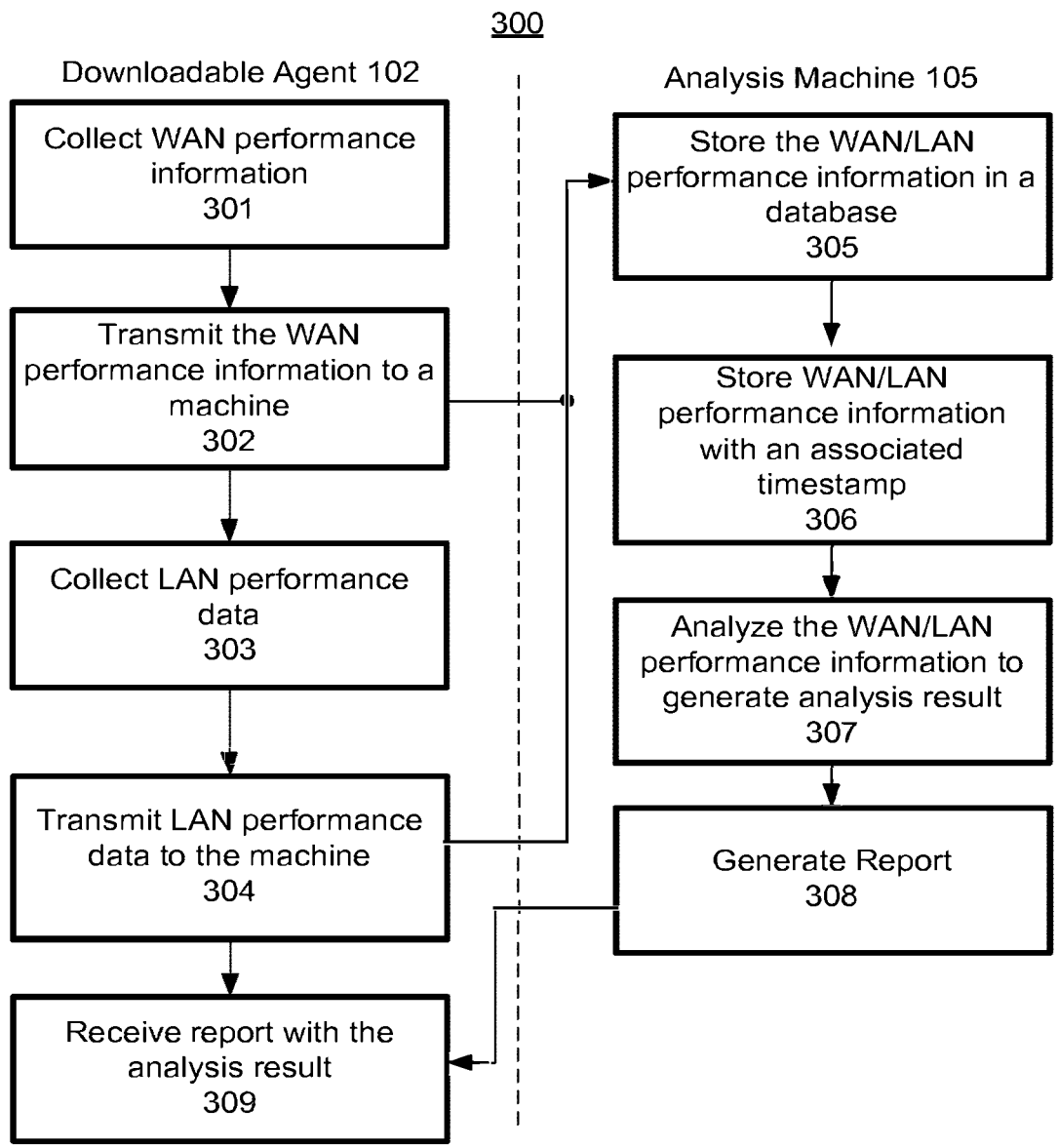
FIG. 3 is a flowchart of a method performed by the downloadable agent and an analysis machine of the communication network, according to one embodiment of the disclosure.

FIG. 3 is a flowchart 300 of a method performed by the downloadable agent 102 and an analysis machine 105 (also referred to as the server 105) of the communication network 100, according to one embodiment of the disclosure. Although the blocks in the flowcharts with reference to FIG. 3 are shown in a particular order, the order of the actions can be modified. Thus, the illustrated embodiments can be performed in a different order, and some actions/blocks may be performed in parallel. The flowchart of FIG. 3 is illustrated with reference to the embodiments of FIGS. 1-2. Some of the blocks and/or operations listed in FIG. 3 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 301, the DA 102 collects WAN performance information, wherein the DA 102 is executable on a computing device (e.g., 101c) coupled to a LAN 111 of a broadband subscriber, wherein the LAN 111 is coupled by another device (e.g., PC 113) to a WAN 112. At block 302, the DA 102 transmits the WAN performance information to a machine (e.g., server 105). At block 303, the DA 102 is operable to collect LAN performance data from at least one of the computing device (e.g., 101c) and the other device (e.g., PC 113) coupled to the LAN 111.

At block 304, the DA 102 is operable to transmit the LAN performance data to the server 105. At block 305, the server 105 is operable to store the WAN/LAN performance information in the database 106 associated with the machine 105. At block 306, the server 105 is operable to store the WAN/LAN performance information with an associated timestamp. At block 307, the server 105 is operable to analyze the WAN/LAN performance information to generate an analysis result. At block 308, the server is operable to report the analysis result to at least one of the broadband subscriber and the broadband subscriber's service provider. At block 309, the DA 102 receives the report with the analysis result from the server 105.

Figure 4A:
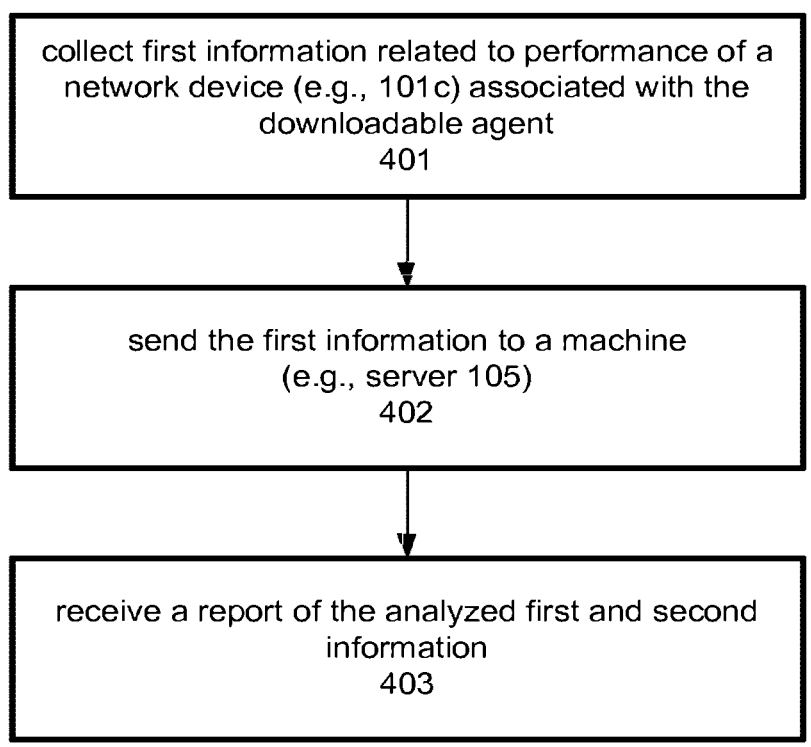
FIG. 4A is a flowchart of a method performed by the downloadable agent, according to another embodiment of the disclosure.

FIG. 4A is a flowchart 400 of a method performed by the downloadable agent 102, according to another embodiment of the disclosure. Although the blocks in the flowcharts with reference to FIG. 4A are shown in a particular order, the order of the actions can be modified. Thus, the illustrated embodiments can be performed in a different order, and some actions/blocks may be performed in parallel. The flowchart of FIG. 4A is illustrated with reference to the embodiments of FIGS. 1-2. Some of the blocks and/or operations listed in FIG. 4A are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 401, the downloadable agent 102 collects first information related to performance of a network device (e.g., 101c) associated with the downloadable agent 102. At block 402, the DA 102 sends the first information to a machine (e.g., server 105), wherein the first information is stored in a database 106 coupled to the machine 105, and wherein the machine 105 is operable to: receive second information from another downloadable agent (e.g., 102 of PC 113); and analyze the first and second information with reference to data already stored in the database 106. In one embodiment, the first and second information is time stamped.

In one embodiment, the first and second information include at least one of: topological information, geographical information, time, throughput, latency, jitter, packet loss, error information (link error rate), type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

At block 403, the DA 102 receives a report of the analyzed first and second information. In one embodiment, reporting the analysis result comprises at least one of: sending statistical analysis including throughput; sending availability of higher bandwidth for operating a DSL service; sending purchase information (or service product information) for improving DSL service performance; or sending utilization information for optimizing a consumers DSL service cost.

In one embodiment, the downloadable agent 102 is executable on multiple computing machines (e.g., PC, smart phone, tablet, CPE, etc). In one embodiment, the downloadable agent 102 is communicatively coupled to a first LAN device 101c. In one embodiment, the method of collecting first information comprises collecting information from multiple computing entities (e.g., 114, 101a, 101b) coupled to the first LAN device 101c. In one embodiment, the other downloadable agent 102 is communicatively coupled to a second LAN device 113. In one embodiment, the other downloadable agent (e.g., 102 of 113) is operable to collect information from multiple computing entities (e.g., 114 and others) coupled to the second LAN device 113, the second LAN device 113 being different from the first LAN device 101c.

In one embodiment, the network device, and the first and second LAN devices comprise at least one of: computer, personal computer (PC), laptop, tablet PC, smart phone, an access point (AP); a base station; a wireless mobile device; a wireless LAN device; a DSLAM; an access gateway; a router; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch, wearable devices, internet enabled cameras, etc.

In one embodiment, the machine is a server 105 in a cloud 104. In one embodiment, the method further comprises: sending an on-demand change request associated with at least one of: throughput, or latency. In one embodiment, the method of receiving the report comprises at least one of: receiving statistical analysis including throughput; receiving availability of higher bandwidth for operating a DSL service; receiving purchase information (or service product information) for improving DSL service performance; or receiving utilization information for optimizing a consumers DSL service cost.

Figure 4B:
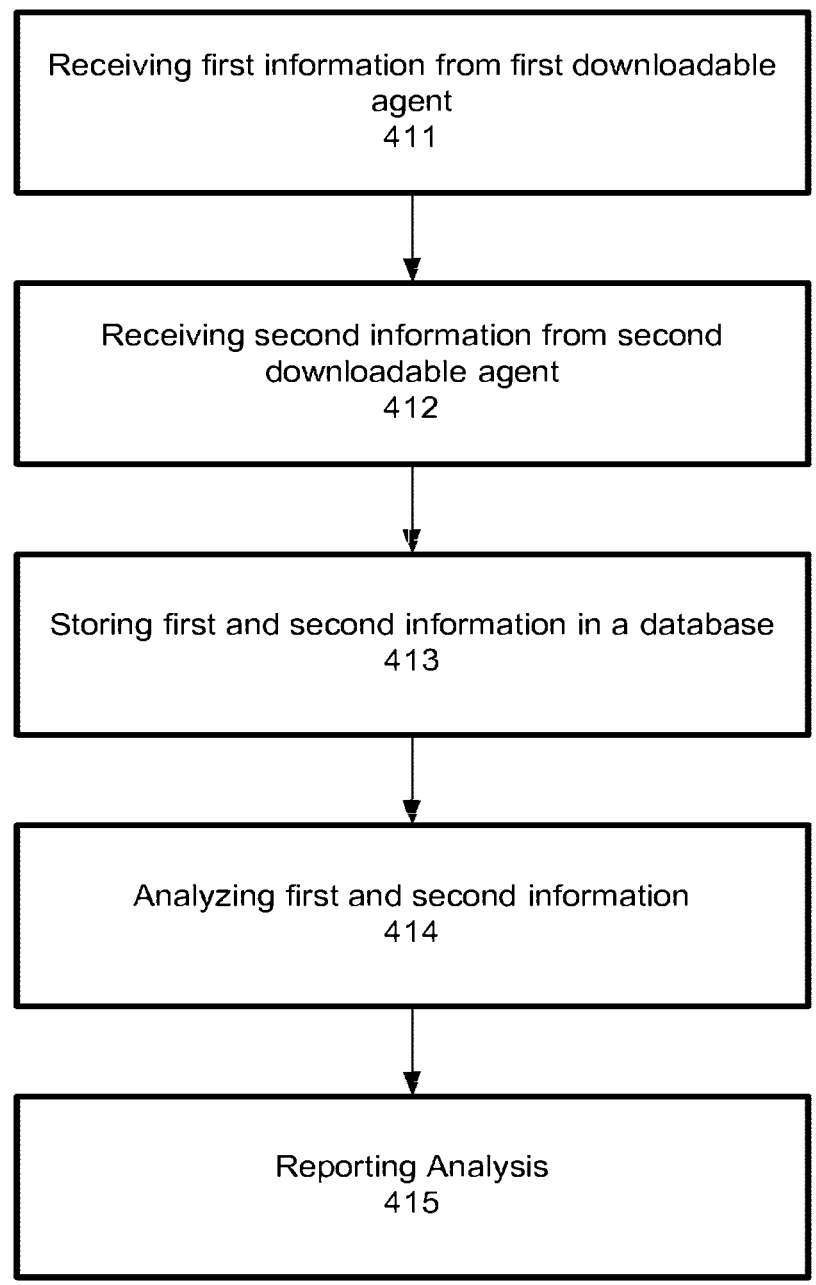
FIG. 4B is a flowchart of a method performed by the server (or analysis machine), according to one embodiment of the disclosure.

FIG. 4B is a flowchart 410 of a method performed by the server 105 (or analysis machine), according to one embodiment of the disclosure. Although the blocks in the flowcharts with reference to FIG. 4B are shown in a particular order, the order of the actions can be modified. Thus, the illustrated embodiments can be performed in a different order, and some actions/blocks may be performed in parallel. The flowchart of FIG. 4B is illustrated with reference to the embodiments of FIGS. 1-3. Some of the blocks and/or operations listed in FIG. 4B are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 411, the server 105 receives first information from a first downloadable agent 102 (e.g., DA 1 of FIG. 2). At block 412, the server 105 receives second information from a second downloadable agent 102 (e.g., DA 2 of FIG. 2). In one embodiment, the first and second information are time stamped. In one embodiment, the first and second information includes at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, the first (e.g., DA 1 of FIG. 2) and second (e.g., DA 2 of FIG. 2) agents are executable on multiple computing machines. In one embodiment, the first downloadable agent (e.g., DA 1 of FIG. 2) is communicatively coupled to a first LAN device 101c. In one embodiment, the first downloadable agent (e.g., DA 1 of FIG. 2) is operable to collect information from multiple computing entities (e.g., 101a, 101b) coupled to the first LAN device 101c. In one embodiment, the first LAN device and the second LAN device are on the same LAN 111. In one embodiment, the first and second LAN devices are coupled to distinct LANs (not shown).

In one embodiment, the second downloadable agent (e.g., DA 1 of FIG. 2) is communicatively coupled to a second LAN device 113. In one embodiment, the second downloadable agent (e.g., DA 1 of FIG. 2) is operable to collect information from multiple computing entities (e.g., 114, and others) coupled to the second LAN device 113, the second LAN device 113 being different from the first LAN device 101c.

In one embodiment, the first PC 101b and second 113 LAN devices comprise at least one of: Computer, personal computer (PC), laptop, tablet PC, smart phone, an access point (AP); a base station; a wireless smart phone device; a wireless LAN device; a router; an access gateway; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch, wearable devices, internet enabled cameras, etc.

In one embodiment, the first (e.g., DA 1 of FIG. 2) and second (e.g., DA 2 of FIG. 2) downloadable agents execute on devices coupled to the same LAN 111. In one embodiment, the first and second downloadable agents execute on devices coupled to distinct LANs (not shown). In such an embodiment, server 105 may (a) process data from distinct LANs separately, to produce analyses and recommendations for each LAN based solely on measurements made from the DAs attached to each respective LAN device; or (b) process data from distinct LANs jointly, to produce analyses and recommendations for each LAN based, at least in part, on data reported from other LANs.

The term "measurement" herein generally refers to information that is collected, and optionally processed, by the DAs from the LAN devices. In one embodiment, the DAs process the information, and send the processed information to the server 105. For example, as opposed to sending collected information regarding raw data rate, the DAs may process the raw data rate and other related information collected over time, to measure throughput and send the measured throughput to the server 105. The measured throughput may be the average raw data rate over a specified period of time.

In one embodiment, jointly processed results from multiple LANs are used to determine whether one of the LANs is under or over-performing relative to its neighboring LANs. In one embodiment, server 105 processes data from the distinct LANs jointly to produce analyses and recommendations for each LAN, among the distinct LANs, according to data reported from each LAN for which analyses and recommendations are being created and from other LANs different from that LAN. In this embodiment, recommendations and analyses are generated for a LAN based on data collected from it and data collected from other LANs.

In one embodiment, jointly processed results from multiple LANs are used to determine whether access to a particular remote host on the Internet from a LAN is under or over performing relative to access to another remote host from that LAN. In one embodiment, comparing performance among LANs may require the presence of downloadable agents on multiple LANs. In one embodiment, comparing performances of access to a particular remote host can be done from a single LAN or from multiple LANs.

In one embodiment, LAN measurements that determine whether a LAN is under or over performing relative to its neighboring LANs, include basic estimates of throughput and stability. In one embodiment, LAN measurements include measurements made from a particular LAN to one or more servers on the Internet to assess average Internet access performance or to access performance for particular Internet sites from devices attached to the LAN.

At block 413, the server 105 stores the first and second information in the database 106. At block 404, the server analyzes the first and second information with reference to data already stored in the database 106. In one embodiment, the method of analyzing the first information with reference to the second information comprises at least one of: performing statistical analysis including throughput; determining availability of higher bandwidth for operating a DSL service; determining purchase information (or service product information) for improving DSL service performance; determining utilization information for optimizing a consumers DSL service cost; or grouping data in the database according to at least one of geographical location, services type, service provider, or time.

At block 415, the server 105 reports the analyzed first and second information to a management entity (e.g., Internet service provider (ISP), DSL controller 103, CPE 101a, PC 101b, PC 113, smart phone 114, etc). In one embodiment, the method of reporting comprises at least one of: providing statistical analysis including throughput; providing availability of higher bandwidth for operating a DSL service; providing purchase information (or service product information) for improving DSL service performance; or providing utilization information for optimizing a consumers DSL service cost, providing latency information for gaming, providing line bandwidth assessment (e.g., whether a line can support more bandwidth than its current bandwidth), providing stability information about a line (e.g., whether a line is now stable enough for higher throughput).

In one embodiment, the method further comprises: determining control information for a DSL operator, the control information according to the analyzed first and second information; and recommending the DSL operator with the control information to improve performance of a DSL service. In one embodiment, the control information relates to on-demand change in performance of the DSL service. In one embodiment, the on-demand change is associated with at least one of: throughput, latency, packet loss, or jitter. In one embodiment, the method of receiving the first and second information is via Internet.

Figure 5A:
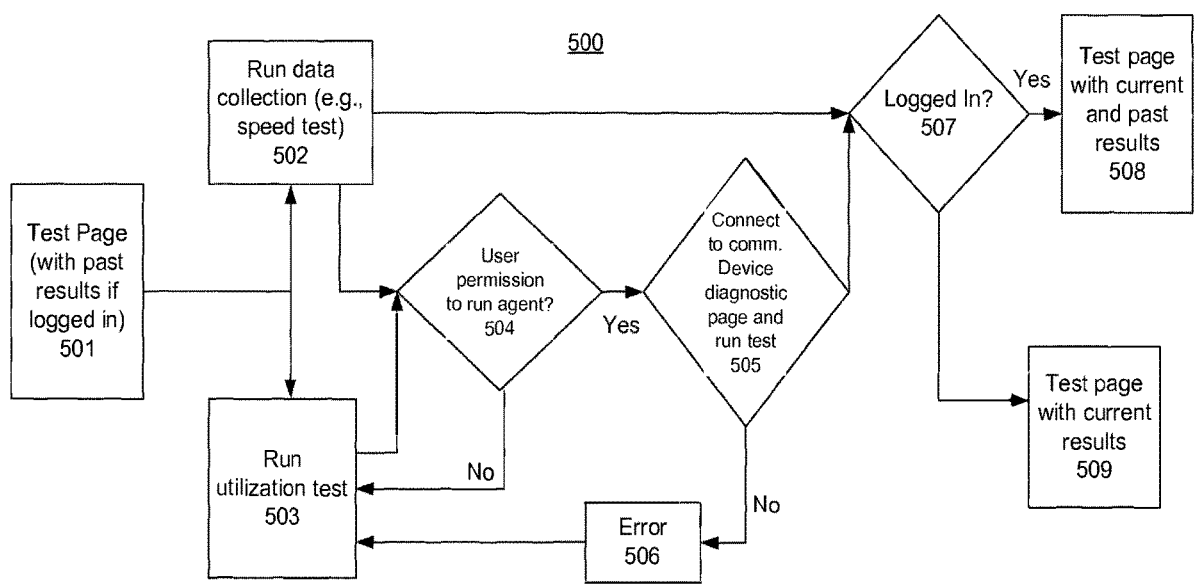
FIG. 5A is flowchart of a method for performing a diagnostic test, according to one embodiment of the disclosure.

FIG. 5A is flowchart 500 of a method for performing a diagnostic test, according to one embodiment of the disclosure. Although the blocks in the flowchart with reference to FIG. 5A are shown in a particular order, the order of the actions can be modified. Thus, the illustrated embodiments can be performed in a different order, and some actions/blocks may be performed in parallel.

Figure 6A:
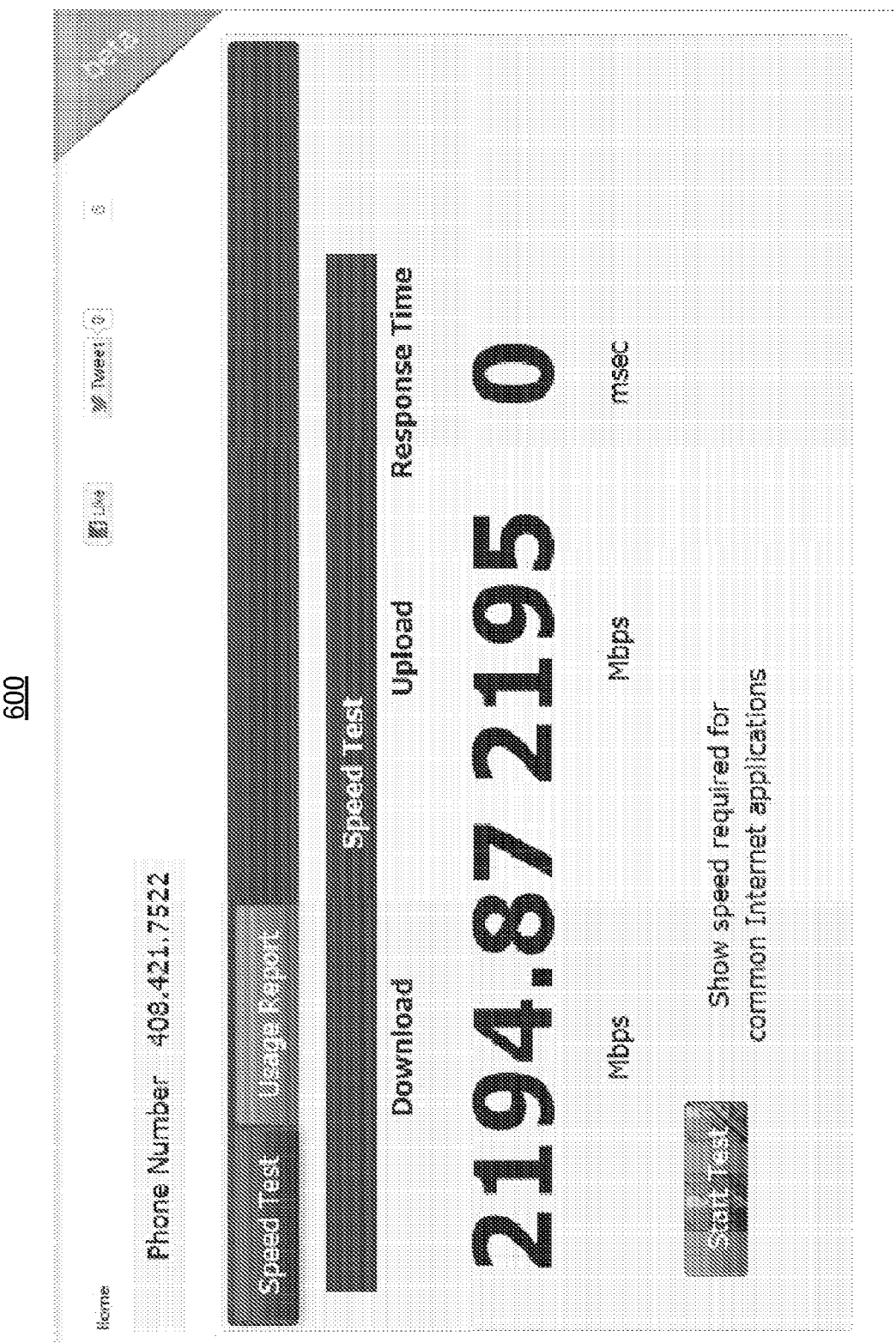
FIG. 6A is an exemplary report provided by the server based on the information received from the downloadable agent, according to one embodiment of the disclosure.

At block 501, the user/customer accesses a test page. In one embodiment, the test page is accessible over the web. FIG. 6A is an exemplary report 600 (or test page) provided by the server 105 based on the information received from the DA 102, according to one embodiment of the disclosure. In one embodiment, the test page provides a number of test options. For example, at block 502 a user may choose to perform a Run Speed test (a test option), which is also shown as the tab Speed Test in FIG. 6A. In another example, at block 503 a user/customer may run a utilization test (another test option), shown by the tab Utilization Test in FIG. 6A. The report 600 illustrates a speed test result page, after performing a speed test. In this particular non-limiting illustration, the report 600 shows the download and upload speeds in Mbps, and also shows an estimate of the response time of the communication device under test. In one embodiment, the report 600 is accessible by a subscriber or user/customer of the particular Internet service being tested.

At block 504, the system (machine on which the agent is running) seeks permission from the user/customer to run the downloadable agent 102 on the machine. If the permission is granted, the downloadable agent 102 attempts to access the communication device (such as a DSL modem) diagnostics page, and would try to run a speed test (e.g., at block 505) or utilization test. If the connection fails, for example due to a link error, the process moves back as shown by block 506. If the test is successful, the process moves to block 507, which checks whether the user/customer is login to the system/server (such as server 105). If the user is logged in, a more complete report is shown to the user at block 508 which includes current and past results. If the user/customer was not logged in, then at block 509 only current results are shown.

The flowcharts discussed herein are merely examples, of an example embodiment, and not all blocks need to be performed. Other embodiments of the disclosure could also map to a similar flowchart. For example, at block 505, the downloadable agent 102 may collect data and produce analysis for the LAN and WAN performance of some other device on the LAN, rather than collecting data and producing analyses for the device on which the DA 102 executes.

Figure 5B:
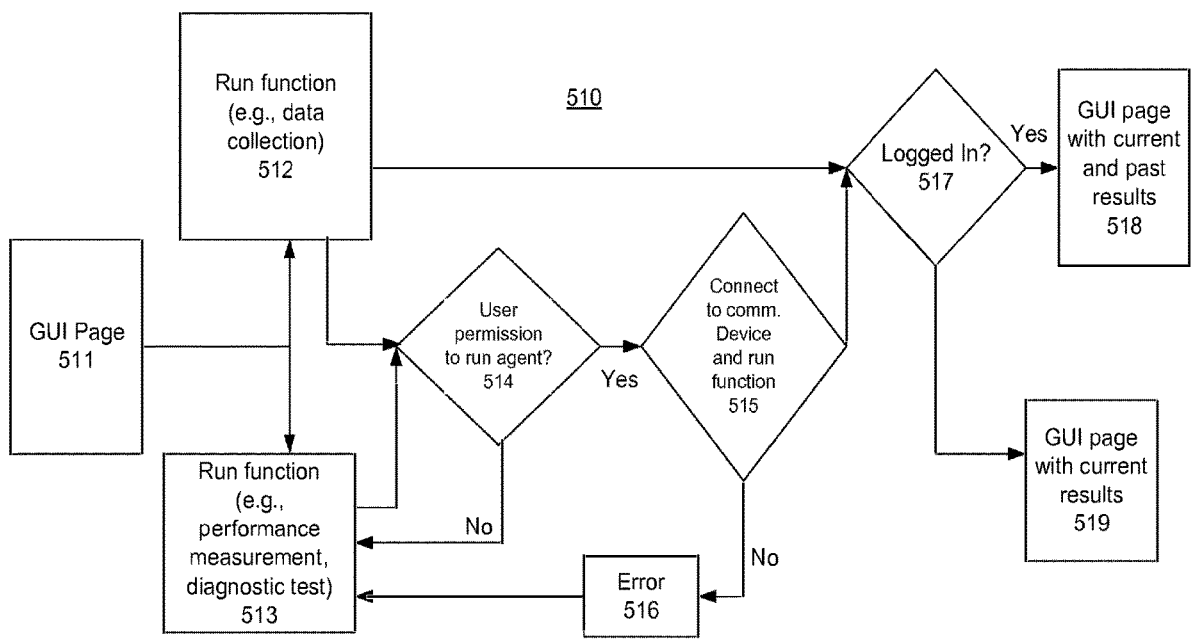
FIG. 5B is flowchart of a method for running (i.e., executing) functions, according to another embodiment of the disclosure.

FIG. 5B is flowchart 510 of a method for running (i.e., executing) functions, according to another embodiment of the disclosure. The figure is similar to FIG. 5A, but more general. Although the blocks in the flowchart with reference to FIG. 5B are shown in a particular order, the order of the actions can be modified. Thus, the illustrated embodiments can be performed in a different order, and some actions/blocks may be performed in parallel.

At block 511, the user/customer accesses a Graphic User Interface (GUI) page. In one embodiment, the GUI page is accessible over the web. In one embodiment, the GUI page provides a number of functions for running diagnostics, performance measurement or data collection. For example, at block 512 a user may choose to perform data collection. In another example, at block 513 a user/customer may run a diagnostics function or a performance measurement.

At block 514, the system (machine on which the agent is running) seeks permission from the user/customer to run the downloadable agent 102 on the machine. If the permission is granted, the downloadable agent 102 attempts to access the communication device (such as a DSL modem), and would try to run one of the functions above (e.g., at block 515), such as a performance measurement or diagnostics test. If the connection fails, for example due to a link error, the process moves back as shown by block 516. If the test is successful, the process moves to block 507, which checks whether the user/customer is login to the system/server (such as server 105). If the user is logged in, a more complete report is shown to the user at block 518 which includes current and past results. If the user/customer was not logged in, then at block 519 only current results are shown.

The flowcharts discussed herein are merely examples, of an example embodiment, and not all blocks need to be performed. Other embodiments of the disclosure could also map to a similar flowchart. For example, at block 505, the downloadable agent 102 may collect data and produce analysis for the LAN and WAN performance of some other device on the LAN, rather than collecting data and producing analyses for the device on which the DA 102 executes.

Figure 6B:
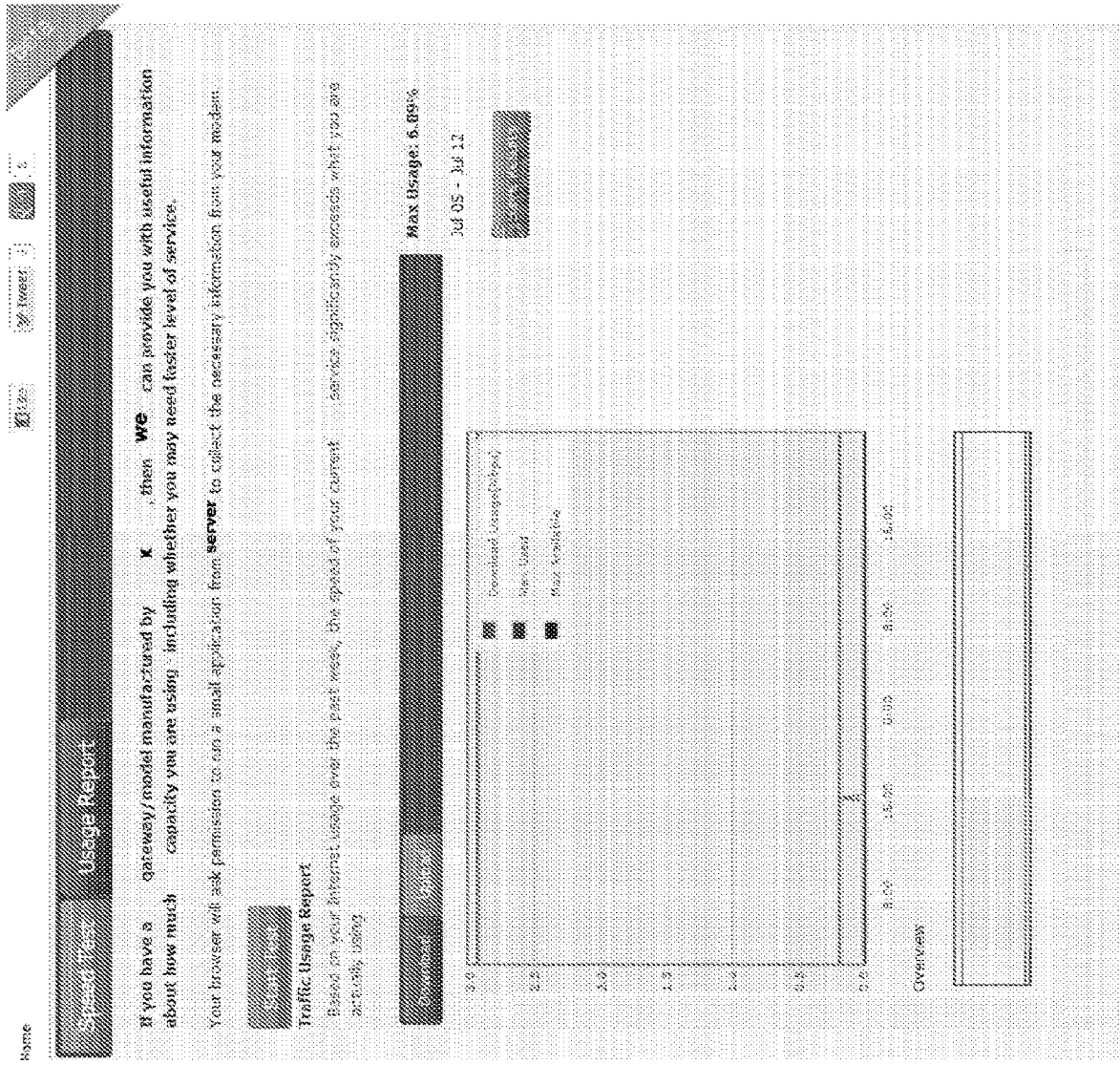
FIG. 6B is another exemplary report provided by the server based on the information received from the downloadable agent, according to one embodiment of the disclosure.

FIG. 6B is another exemplary report 620 provided by the server based on received information from the downloadable agent, according to one embodiment of the disclosure. The report 620 depicts a usage report, according to one embodiment. The report 620, for example, includes information on utilization of the capacity of the subscriber or user/customer link The report 620 may also provide information on whether a customer link has the potential to operate at higher speeds. The report 620 also shows a Traffic Usage Report. The example Traffic Usage Report shows traffic information collected over a week, such as Download Usage, max data rate used, max available data rate, etc.

Figure 7:
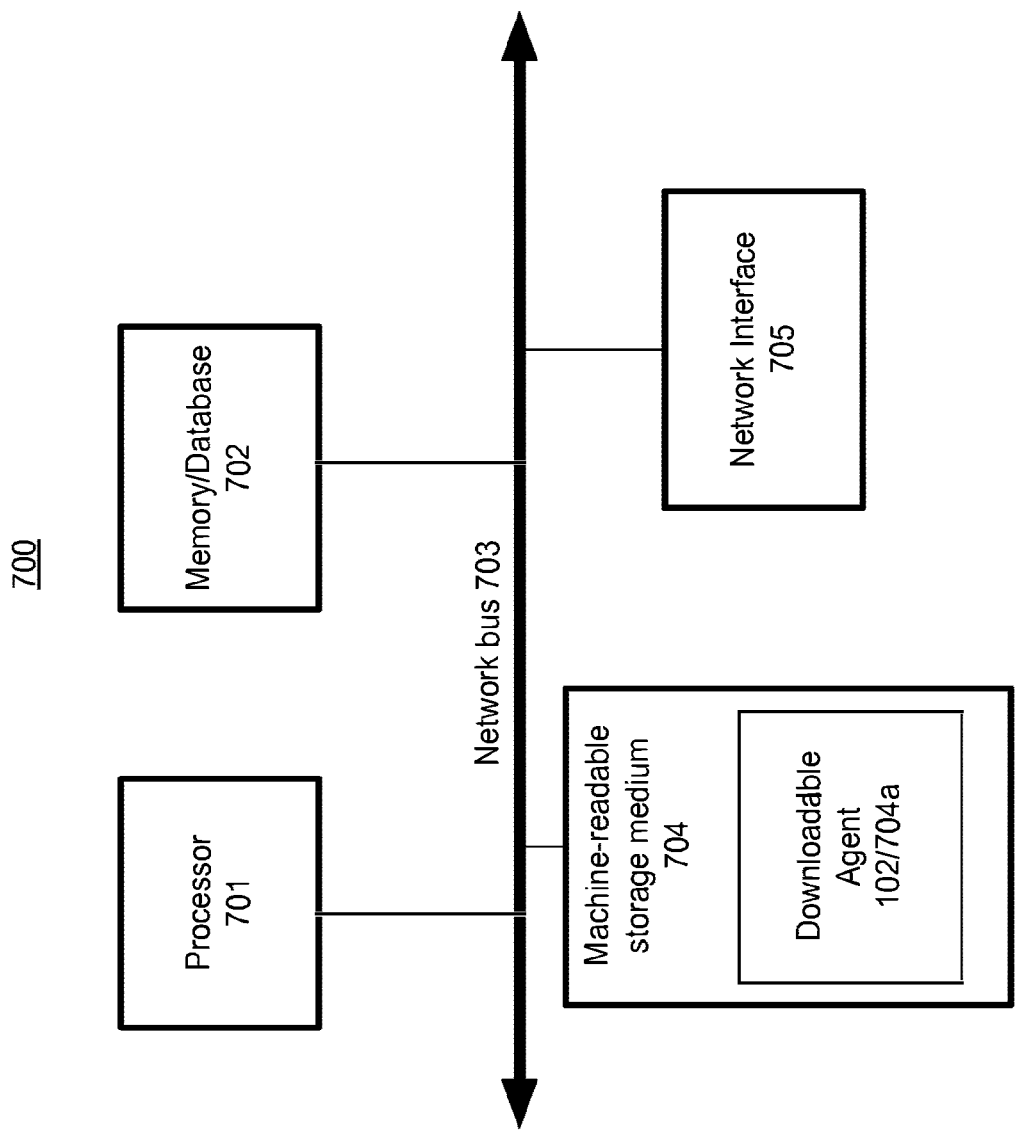
FIG. 7 is a processor-based system having machine-readable storage medium with computer executable instructions of a downloadable agent, according to one embodiment of the disclosure.

FIG. 7 is a processor-based system 700 having machine-readable storage medium with computer executable instructions of a downloadable agent, according to one embodiment of the disclosure. The storage medium 704 and associated computer executable instructions 102/704*a* may be in any of the communication devices and/or servers discussed herein. The computer-machine-readable/executable instructions 102/704*a* are executed by a processor 701. Elements of embodiments are provided as machine-readable medium for storing the computer-executable instructions (e.g., instructions to implement the flowcharts of FIGS. 2 and 4 and other processes discussed in the description).

In one embodiment, the processor-based system 700 further comprises a database 702 to store data used by the instructions 102/704*a*. In one embodiment, the processor-based system 700 includes a network interface 705 to communicate with other devices. In one embodiment, the components of the processor-based system 700 communicate with one another via a network bus 703.

The machine-readable storage medium 704 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Figure 8:
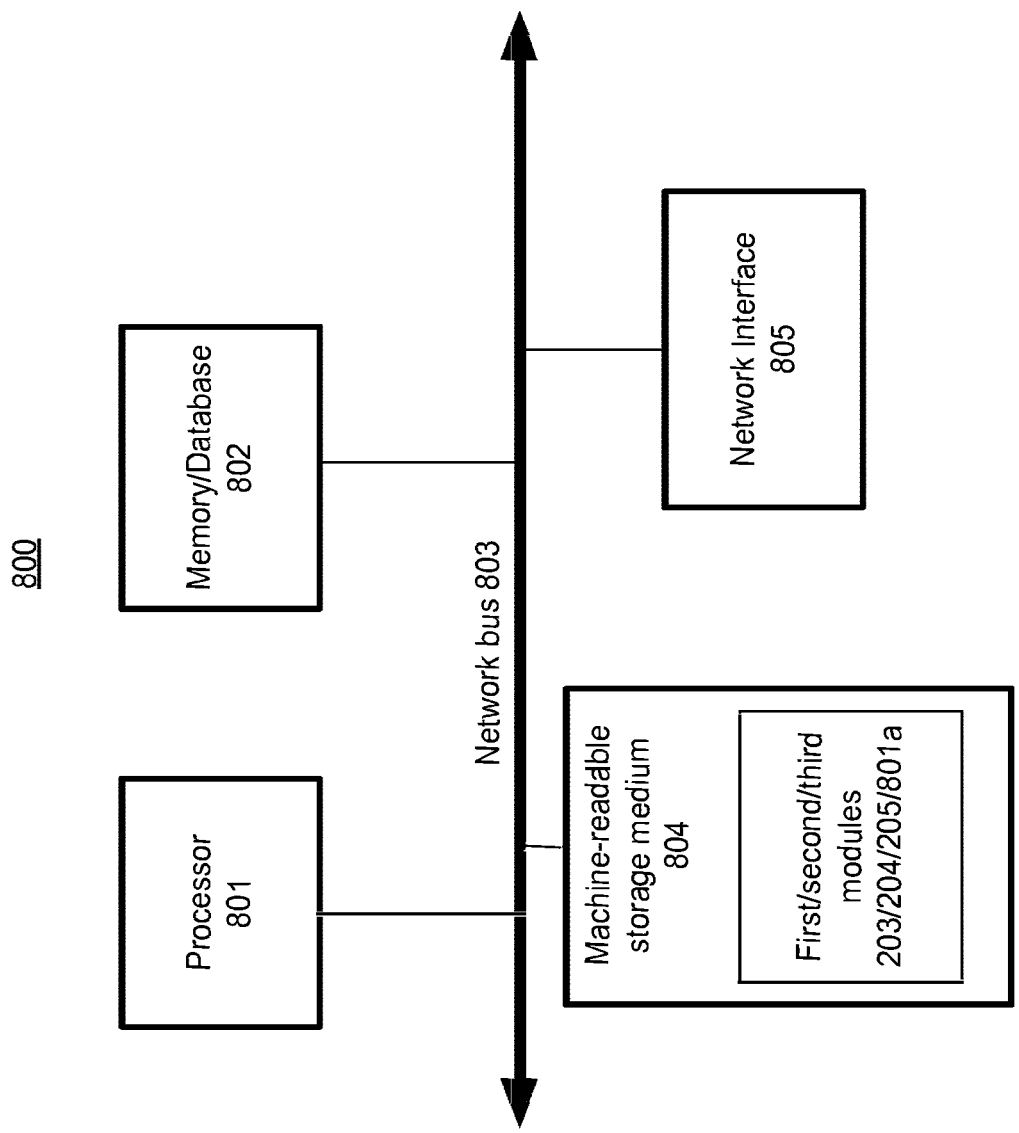
FIG. 8 is a processor-based system having machine-readable storage medium with computer executable instructions executed by the server, according to one embodiment of the disclosure.

FIG. 8 is a processor-based system 800 having machine-readable storage medium with computer executable instructions executed by the server 105, according to one embodiment of the disclosure. The storage medium 804 and associated computer executable instructions 202/203/204/804*a* may be in any of the communication devices and/or servers discussed herein. The computer-machine-readable/executable instructions 202/203/204/804*a* are executed by a processor 801 of the server 105. Elements of embodiments are provided as machine-readable medium for storing the computer-executable instructions (e.g., instructions to implement the flowcharts of FIGS. 2, 4, 6B and other processes discussed in the description).

In one embodiment, the processor-based system 800 further comprises a database 802 to store data used by the instructions 202/203/204/804*a*. In one embodiment, the processor-based system 800 includes a network interface 605 to communicate with other devices. In one embodiment, the components of the processor-based system 600 communicate with one another via a network bus 803.

The machine-readable storage medium 804 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, in one embodiment a method performed by a downloadable agent comprises: collecting WAN performance information, wherein the downloadable agent is executable on a computing device coupled to a LAN of a broadband subscriber, wherein the LAN is coupled by another device to a WAN; and transmitting the WAN performance information to a machine; wherein the machine is operable to: store the WAN performance information in a database associated with the machine, analyze the WAN performance information to generate an analysis result; and report the analysis result to at least one of the broadband subscriber and the broadband subscriber's service provider.

In one embodiment, the other device is a router. In one embodiment, the machine is operable to store the WAN performance information with an associated timestamp. In one embodiment, the downloadable agent is operable to collect LAN performance data from at least one of the computing device and other device coupled to the LAN. In one embodiment, the method further comprises transmitting by the downloadable agent the LAN performance data to the machine.

In one embodiment, the downloadable agent is executable in a virtual machine on the computing device. In one embodiment, the downloadable agent is dynamically downloaded to the computing device. In one embodiment, the method further comprises receiving the analysis result, wherein receiving the analysis result comprises at least one of: receiving statistical analysis including throughput; receiving availability of higher bandwidth for operating a DSL service; receiving purchase information (or service product information) for improving DSL service performance; or receiving utilization information for optimizing a consumers DSL service cost.

In one embodiment, the WAN performance information includes at least one of: topological information, geographical information, throughput, latency, jitter, packet loss, time, type of communication device, device network identification, manufacturer and model of equipment, equipment characteristics, firmware, user's network usage pattern, user's provisioned WAN service, RF characteristics including at least one of: signal power, frequency bands and mode of operation, environment statistics, or data on operation of communication devices.

In one embodiment, the method further comprises: sending an on-demand change request associated with at least one of: throughput, or latency. In one embodiment, the machine is a server that resides in a cloud. In one embodiment, the computing device is one of: a personal computer; a gaming console; an access point (AP); a base station; a wireless smart phone device; a wireless LAN device; an access gateway; a router; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In another example, a machine readable storage medium is provided having computer executable instructions that when executed cause a processor to perform a method according to any one of method discussed above.

In another example, a system comprises: a database; and a server coupled to the database, the server operable to: receive WAN performance information from a downloadable agent, wherein the downloadable agent is executable on a computing device coupled to a LAN of a broadband subscriber, wherein the LAN is coupled by another device to a WAN; and store the WAN performance information in the database associated with the server, analyze the WAN performance information to generate an analysis result; and report the analysis result to at least one of the broadband subscriber and the broadband subscriber's service provider.

In one embodiment, the server resides in a cloud. In one embodiment, the server is operable to store the WAN performance information with an associated timestamp. In one embodiment, the downloadable agent is operable to collect LAN performance data from at least one of the computing device and other device coupled to the LAN. In one embodiment, the server is operable to receive from the downloadable agent the LAN performance data. In one embodiment, the server comprises: a first module for collecting the WAN performance information; a second module for performing statistical analysis using the first WAN performance information; and a third module for generating instruction and commands according to the statistical analysis for at least one of the broadband subscriber, networking equipment at the broadband subscriber's premises, the service provider of the broadband subscriber and the access equipment of the service provider.

In one embodiment, the modules that receive the instruction and command from the third module are accessible by internet. In one embodiment, the server comprises: a management interface for communicating with the downloadable agent via internet. In one embodiment, the server comprises: a user interface module for providing access and for displaying information associated with the first, second, third modules.

In one embodiment, the server is operable to compute throughput of DSL connection by collecting current performance metrics associated with DSL service. In one embodiment, the server to perform throughput computation with reference to a website. In one embodiment, the through-put computation comprises probing a network. In one embodiment, the downloadable agent is executable in a virtual machine on the computing device. In one embodiment, the downloadable agent is dynamically downloaded to the computing device.

In one embodiment, reporting the analysis result comprises at least one of: sending statistical analysis including throughput; sending availability of higher bandwidth for operating a DSL service; sending purchase information (or service product information) for improving DSL service performance; or sending utilization information for optimizing a consumers DSL service cost. In one embodiment, the WAN performance information includes at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, the system is operable to receive an on-demand change request associated with at least one of: throughput, or latency. In one embodiment, the computing device is one of: an access point (AP); a base station; a wireless smartphone device; a wireless LAN device; an access gateway; a router, a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ether net connected router; an Ethernet connected wireless bridge; an Ethernet connected network bridge; and an Ethernet connected network switch.

In another example, a method performed by a server comprises: receiving first information from a first downloadable agent; receiving second information from a second downloadable agent; storing the first and second information in a database; analyzing the first and second information with reference to data already stored in the database; and reporting the analyzed first and second information to a management entity.

In one embodiment, the first and second information are time stamped. In one embodiment, the first and second agents are executable on multiple computing machines. In one embodiment, the first downloadable agent is communicatively coupled to a first LAN device. In one embodiment, the first downloadable agent is operable to collect information from multiple computing entities coupled to the first LAN device. In one embodiment, the second downloadable agent is communicatively coupled to a second LAN device. In one embodiment, the second downloadable agent is operable to collect information from multiple computing entities coupled to the second LAN device, the second LAN device being different from the first LAN device.

In one embodiment, the first and second LAN devices comprise at least one of: tablet computing device; an access point (AP); a base station; a wireless smartphone device; a wireless LAN device; a router; an access gateway; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the first and second downloadable agents execute on devices coupled to the same LAN. In one embodiment, the first and second downloadable agents execute on devices coupled to distinct LANs. In one embodiment, the method further comprises: determining control information for a DSL operator, the control information according to the analyzed first and second information; and recommending the DSL operator with the control information to improve performance of a DSL service.

In one embodiment, the control information relates to on-demand change in performance of the DSL service. In one embodiment, the on-demand change is associated with at least one of: throughput, latency, packet loss, or jitter. In one embodiment, the method of reporting comprises at least one of: providing statistical analysis including throughput; providing availability of higher bandwidth for operating a DSL service; providing purchase information (or service product information) for improving DSL service performance; or providing utilization information for optimizing a consumers DSL service cost. In one embodiment, the method of receiving the first and second information is via Internet.

In one embodiment, the first and second information includes at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, the method of analyzing the first information with reference to the second information comprises at least one of: performing statistical analysis including throughput; determining availability of higher bandwidth for operating a DSL service; determining purchase information (or service product information) for improving DSL service performance; determining utilization information for optimizing a consumers DSL service cost; or grouping data in the database according to at least one of geographical location, services type, service provider, or time.

In one embodiment, the method further comprises: processing data from the distinct LAN s separately to produce analyses and recommendations for each LAN, among the distinct LANs, according to measurements made by corresponding first or second downloadable agents. In one embodiment, the method of further comprises: processing data from the distinct LANs jointly to produce analyses and recommendations for each LAN, among the distinct LANs, according to data reported from each LAN for which analyses and recommendations are being created and from other LAN s different from that LAN. In one embodiment, the analyses for each LAN include at least one of: whether the LAN is under or over performing relative to a neighboring LAN; or whether access to a particular remote host on the Internet from a LAN is under or over performing relative to access to another remote host from that LAN.

In one embodiment, the server comprises: a first module for collecting the first and second information; a second module for performing statistical analysis using the first and/or second information; and a third module for generating instruction and command for the first and/or second devices or modules according to the statistical analysis. In one embodiment, the modules that receive the instruction and command from the third module are accessible by internet. In one embodiment, the server comprises: a management interface for communicating with the first and second downloadable agents via internet. In one embodiment, the server comprises: a user interface module for providing access and for displaying information associated with the first, second, third modules.

In one embodiment, the first information is collected by a downloadable agent coupled to a DSL connection, the downloadable agent to send the first information to the server. In one embodiment, the server resides in a cloud. In one embodiment, the server is operable to compute throughput of a DSL connection by collecting current performance metrics associated with the DSL service. In one embodiment, the server to perform throughput computation with reference to a website. In one embodiment, the throughput computation comprises probing a network.

In one embodiment, the method of probing comprises: transmitting probing data from a communication device to another communication device; and waiting for a predetermined time before reading operational data including counter values related to user data traffic. In one embodiment, the method of probing comprises: transmitting probing data from a communication device to another communication device; and receiving a report indicating amount of data or data received by the other communication device. In one embodiment, the server is operable to apply a machine learning algorithm for training a performance estimation algorithm for the communication device.

In another example, a machine readable storage medium is provided having computer executable instructions that when executed cause a processor to perform a method according to the method discussed above.

In another example, a system comprises: a database; a communication interface for communicating with other devices; and a server coupled to the database and the communication interface, wherein the server is operable to perform a method according to the method discussed above.

In one embodiment, the server comprises: a first module for collecting the first and second information; a second module for performing statistical analysis using the first and/or second information; and a third module for generating instruction and command for the first and/or second devices or modules according to the statistical analysis. In one embodiment, the modules that receive the instruction and command from the third module are accessible by internet. In one embodiment, the server comprises: a management interface for communicating with the first and second agents via internet. In one embodiment, the server comprises: a user interface module for providing access and for displaying information associated with the first, second, third modules.

In one embodiment, the first information is collected by a downloadable agent coupled to a DSL connection, the downloadable agent to send the first information to the server. In one embodiment, the server is operable to compute throughput of the DSL connection by collecting current performance metrics associated with the DSL service. In one embodiment, the server to perform throughput computation with reference to a website. In one embodiment, the throughput computation comprises probing a network. In one embodiment, the server resides in a cloud. In one embodiment, the communication interface comprises at least one of: a wired Ethernet interface; a powerline communications interface; or a wireless interface.

In one embodiment, the other devices comprise at least one of: tablet computing device; an access point (AP); a base station; a wireless mobile device; a wireless LAN device; an access gateway; a router; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In another example, a method performed by a downloadable agent on a processor comprises: collecting first information related to performance of a network device associated with the downloadable agent; sending the first information to a machine, wherein the first information is stored in a database coupled to the machine, and wherein the machine is operable to: receive second information from another downloadable agent; and analyze the first and second information with reference to data already stored in the database; and receiving a report of the analyzed first and second information.

In one embodiment, the first and second information is time stamped. In one embodiment, the downloadable agent is executable on multiple computing machines. In one embodiment, the downloadable agent is communicatively coupled to a first LAN device. In one embodiment, the method of collecting first information comprises collecting information from multiple computing entities coupled to the first LAN device. In one embodiment, the other downloadable agent is communicatively coupled to a second LAN device. In one embodiment, the other downloadable agent is operable to collect information from multiple computing entities coupled to the second LAN device, the second LAN device being different from the first LAN device.

In one embodiment, the network device, and the first and second LAN devices comprise at least one of: tablet computing device; an access point (AP); a base station; a wireless mobile device; a wireless LAN device; a DSLAM; an access gateway; a router; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the machine is a server in a cloud. In one embodiment, the first and second information include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, the method further comprises: sending an on-demand change request associated with at least one of: throughput, or latency. In one embodiment, the method of receiving the report comprises at least one of: receiving statistical analysis including throughput; receiving availability of higher bandwidth for operating a DSL service; receiving purchase information (or service product information) for improving DSL service performance; or receiving utilization information for optimizing a consumers DSL service cost.

In one embodiment, the machine is operable to: process data from distinct LANs separately to produce analyses and recommendations for each LAN, among the distinct LANs, according to measurements made by respective downloadable agents coupled to respective distinct LANs. In one embodiment, the machine is operable to: process data from distinct LANs jointly to produce analyses and recommendations for each LAN, among the distinct LANs, according to data reported from each LAN for which analyses and recommendations are being created and from other LANs different from that LAN. In one embodiment, the analyses for each LAN include at least one of: whether the LAN is under or over performing relative to a neighboring LAN; or whether access to a particular remote host on the Internet from a LAN is under or over performing relative to access to another remote host from that LAN.

In another example, a method performed by a downloadable agent on a processor comprises: collecting first information related to performance of a network device associated with the downloadable agent; sending the first information to a machine, wherein the first information is stored in a database coupled to the machine, and wherein the machine is operable to: receive second information from another downloadable agent; and analyze the first and second information with reference to data already stored in the database; and receiving a report of the analyzed first and second information.

In one embodiment, the first and second information is time stamped. In one embodiment, the downloadable agent is executable on multiple computing machines. In one embodiment, the downloadable agent is communicatively coupled to a first LAN device.

In one embodiment, collecting first information comprises collecting information from multiple computing entities coupled to the first LAN device. In one embodiment, the other downloadable agent is communicatively coupled to a second LAN device. In one embodiment, the other downloadable agent is operable to collect information from multiple computing entities coupled to the second LAN device, the second LAN device being different from the first LAN device.

In one embodiment, the network device and the first and second LAN devices comprise at least one of: an access point (AP); a base station; a wireless mobile device; a wireless LAN device; a DSLAM; an access gateway; a router; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; an Ethernet connected network switch; wearable device; and internet enabled cameras.

In one embodiment, the machine is a server in a cloud. In one embodiment, the first and second information include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, the further comprises: sending an on-demand change request associated with at least one of: throughput, or latency. In one embodiment, receiving the report comprises at least one of: receiving statistical analysis including throughput; receiving availability of higher bandwidth for operating a DSL service; receiving service product information for improving DSL service performance; or receiving utilization information for optimizing a consumers DSL service cost.

In one embodiment, the machine is operable to: process data from distinct LANs separately to produce analyses and recommendations for each LAN, among the distinct LAN s, according to measurements made by respective downloadable agents coupled to respective distinct LANs. In one embodiment, the machine is operable to: process data from distinct LANs jointly to produce analyses and recommendations for each LAN, among the distinct LANs, according to data reported from each LAN for which analyses and recommendations are being created and from other LANs different from that LAN.

In one embodiment, the analyses for each LAN include at least one of: whether the LAN is under or over performing relative to a neighboring LAN; or whether access to a particular remote host on the Internet from a LAN is under or over performing relative to access to another remote host from that LAN. In one embodiment, the downloadable agent is executable on an Internet browser. In one embodiment, the downloadable agent is accessible remotely via the Internet.

In one embodiment, the method further comprises periodically sending collected first information to the machine. In one embodiment, the method further comprises waiting for a predetermined condition or threshold to be satisfied before sending the first information to the machine. In one embodiment, the predetermined condition or threshold is at least one of: a function of a type of data collected, or limit or threshold on a performance level associated with the collected data. In one embodiment, the machine is operable the first information by polling or scheduled based system. In one embodiment, the method further comprises collecting data from at least one of: National Weather Service; radio station; or operator.

In another example, a machine readable storage medium is provided having computer executable instructions that when executed cause a processor to perform a method according to the method discussed above.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A method for managing a communication system using a downloadable agent and a server, the method comprising:
   receiving Local Area Network (LAN) performance data at the server, the LAN performance data being measured by a computing device on which the downloadable agent is executed, the server being operable to:
     store the LAN performance data in a database;
     analyze the LAN performance data to generate a LAN analysis result related to throughput within the LAN; and
     report the LAN analysis result to at least one of a broadband subscriber and a broadband subscriber's service provider;
   in response to receiving an on-demand change request from the computing device, determining whether the on-demand change request can be met based at least in part on the stored LAN performance data; and
   if the on-demand change request can be met, transmitting a report to the computing device relating to a performance improvement of the communication system.

2. The method of claim 1 wherein the computing device is communicatively coupled to the server via a Wi-Fi access point.

3. The method of claim 1 wherein the communication system is a LAN.

4. The method of claim 1 wherein the communication system is a wide area network (WAN).

5. The method of claim 1 further comprising the steps of:
   receiving WAN performance data at the server, the WAN performance data being measured by another computing device on which another downloadable agent is executed, the server being operable to:
     store the WAN performance data in a database associated with the WAN; and
     analyze the WAN performance data to generate a WAN analysis result, the WAN analysis result related to the performance improvement of the communication system.

6. The method of claim 5 wherein the server is further operable to report the WAN analysis result to at least one of the broadband subscriber and the broadband subscriber's service provider.

7. The method of claim 5 wherein the LAN performance data and the WAN performance data are related to each other.

8. The method of claim 5 wherein the WAN analysis result comprises at least one of:
   availability of higher bandwidth for operating a service;
   service product information for improving service performance; and
   utilization information for optimizing a consumer's service cost.

9. The method of claim 5 wherein the WAN performance data comprises at least one of:
   topological information, geographical information, latency, jitter, packet loss, time, type of communication device, device network identification, manufacturer and model of equipment, equipment characteristics, firmware, user's network usage pattern, and user's provisioned WAN service; and
   RF characteristics including at least one of: signal power, frequency bands and mode of operation, environment statistics, or data on operation of communication devices.

10. The method of claim 1 wherein the LAN performance data is received after a predetermined threshold is satisfied to trigger the LAN performance data to be sent from the computing device.

11. The method of claim 10 wherein the predetermined threshold is at least one of:
    a function of a type of data collected; and
    a limit or threshold on a performance level associated with the collected data.

12. The method of claim 1 wherein the LAN performance data comprises at least one of:
    topological information, geographical information, latency, jitter, packet loss, time, type of communication device, device network identification, manufacturer and model of equipment, equipment characteristics, firmware, user's network usage pattern, and user's provisioned LAN service; and
    RF characteristics including at least one of: signal power, frequency bands and mode of operation, environment statistics, or data on operation of communication devices.

13. The method of claim 1 wherein the computing device is one of:
    a tablet computing device,
    a personal computer,
    a gaming console,
    an access point (AP),
    a base station,
    a wireless smartphone device,
    a wireless LAN device,
    an access gateway,
    a router,
    a performance enhancement device,
    a Digital Subscriber Line (DSL) Customer Premises Equipment (CPE) modem,
    a cable CPE modem,
    an in-home powerline device, a Home Phoneline Network Alliance (HPNA) based device,
an in-home coax distribution device,
a G.hn compatible device,
an in-home metering communication device,
an in-home appliance communicatively interfaced with the LAN,
a wireless femtocell base station,
a wireless Wi-Fi compatible base station,
a wireless mobile device repeater,
a wireless mobile device base station,
a node within an ad-hoc/mesh network,
a set-top box (STB)/set-top unit (STU) customer electronics device,
an Internet Protocol (IP) enabled television,
an IP enabled media player,
an IP enabled gaming console,
an Ethernet gateway,
a computing device connected to the LAN,
an Ethernet connected computer peripheral device,
an Ethernet connected router,
an Ethernet connected wireless bridge,
an Ethernet connected network bridge,
an Ethernet connected network switch,
a wearable device, or
an internet enabled camera.

14. A non-transient computer-readable storage medium having instructions tangibly stored thereon, the instructions for managing a communication system using a downloadable agent and a server comprising the steps of:

receiving Local Area Network (LAN) performance data at a server, the LAN performance data being measured by a computing device on which the downloadable agent is executed, the server being operable to:

store the LAN performance data in a database;

analyze the LAN performance data to generate an analysis result related to throughput within the LAN; and report the LAN analysis result to at least one of a broadband subscriber and a broadband subscriber's service provider;

in response to receiving an on-demand change request from the computing device, determining whether the on-demand change request can be met based at least in part on the stored LAN performance data; and if the on-demand change request can be met, transmitting a report to the computing device relating to a performance improvement of the communication system.

* * * * *